United States Patent
Bernecky et al.

(10) Patent No.: US 7,639,565 B2
(45) Date of Patent: Dec. 29, 2009

(54) POINT SOURCE LOCALIZATION SONAR SYSTEM AND METHOD

(75) Inventors: W. Robert Bernecky, Mystic, CT (US); Matthew J. Krzych, Tiverton, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 291 days.

(21) Appl. No.: 11/767,787

(22) Filed: Jun. 25, 2007

(65) Prior Publication Data

US 2008/0316862 A1 Dec. 25, 2008

(51) Int. Cl.
*H04B 11/00* (2006.01)
(52) U.S. Cl. .................................................. 367/131
(58) Field of Classification Search ................ 367/130, 367/131, 128, 118
See application file for complete search history.

(56) References Cited

U.S. PATENT DOCUMENTS 5,357,484 A * 10/1994 Bates et al. ................. 367/118
5,481,505 A * 1/1996 Donald et al. ............... 367/130
2008/0181056 A1 * 7/2008 Bernecky .................... 367/21
2008/0316862 A1 * 12/2008 Bernecky et al. ........... 367/131

* cited by examiner

*Primary Examiner*—Dan Pihulic
(74) *Attorney, Agent, or Firm*—James M. Kasischke; Michael P. Stanley; Jean-Paul A. Nasser

(57) ABSTRACT

A matched-field based sonar system and method of use that supports real-time, three-dimensional acoustic source localization using a mobile, horizontal array. The system receives and processes acoustic array, non-acoustic array, and own-ship navigational data in the matched-field process (MFP). Driven by own-ship and array status, a global bathymetry database and an acoustic environmental model are used to generate replicas for the MFP. If a three-dimensional tracker is assigned, then the tracker will steer the search region to maintain contact on the target of interest. Displays are provided to the user including tracker displays (which provide tracker information), MFP ambiguity surface displays (which support contact localization), and non-acoustic and navigational displays. A control interface allows a user to control the search region in bearing, range, depth, and frequency; assign the three-dimensional tracker function; and control display processing.

21 Claims, 8 Drawing Sheets

POINT SOURCE LOCALIZATION SONAR SYSTEM AND METHOD

STATEMENT OF GOVERNMENT INTEREST

The invention described herein may be manufactured and used by or for the Government of the United States of America for governmental purposes without the payment of any royalties thereon or therefore.

CROSS-REFERENCE TO RELATED APPLICATIONS

The present invention relates to U.S. patent application Ser. No. 11/699,246; filed 30 Jan. 2007 and entitled "Method For Real-Time Matched Field Processing" by the inventor, W. Robert Bernecky.

BACKGROUND OF THE INVENTION (1) Field of the Invention

The present invention generally relates to sonar systems and methods and, more specifically, to a matched-field based sonar system and method that supports real-time, passive, three-dimensional acoustic-source localization using a mobile horizontal array.

(2) Description of Prior Art

Sonar systems detect and locate underwater objects, including missiles, torpedoes, and submarines. Active sonar systems transmit and receive in a set direction, while passive systems listen to all angles at all times. Passive sonar systems are mainly used in military applications because they are silent, have a much greater range than active sonar, and allow identification of a target through target motion analysis (TMA). TMA determines the target's trajectory (i.e. target's range, course, and speed). Thus far, TMA has been performed using own-ship maneuvers and triangulation, e.g., marking the direction from which sound comes at different times and comparing the motion with that of the operator's ship. Changes in relative motion are analyzed using standard geometrical techniques and assumptions about limiting cases. This process is extremely time-consuming and requires manual interaction. Also, in order to calculate speed, the operator must know certain contact characteristics that are acquired over time.

Passive sonar is typically deployed in the form of towed arrays to enhance detection of sound sources. Towed sonar arrays are sonar systems that are designed to be towed by a submarine or a surface vessel in order to detect other submarines or objects. The arrays are typically long, hose-like structures measuring up to a thousand feet or longer that contain specially designed acoustic sensors (hydrophones) that receive acoustic waves. The arrays include electronics that convert the acoustical waves from analog to digital form and transmit that data to electronic processors on board the towing vessel.

One of the most important features of an array is that the array allows for beamforming which can be used for acoustic source localization. Since these are passive systems they must listen to all angles at all times and this requires a number of beams. At the same time, a narrow beamwidth is required for locating the source and rejecting ambient noise. These two objectives are achieved simultaneously by a passive beamforming processor. The input/output of each transducer is put through the beamforming processor, which applies time delays or phase shifts to each of the signals in such a way as to create a narrow beam in a particular direction. This increases the gain in the direction of wanted signals and decreases the gain in the direction of interference and noise. Depending on the speed of the towing platform, a towed array may display a level of cant (i.e. inclination to the horizontal plane). Sonar processors that disregard the effect of array cant will erroneously report contacts at an erroneous bearing.

A number of approaches to beamforming and other acoustic-source localization techniques exist. These include plane wave beamforming, range-focused beamforming, multipath-ranging technique, and matched field processing (MFP). Of these, plane wave beamforming is the most mature and is the easiest to implement. For a single line towed array, it provides only bearing information however, and accuracy diminishes as the acoustic source moves from broadside to end-fire. Range focused beamforming improves on this by additionally providing range estimates. However, these range estimates have very coarse resolution and like plane wave beamforming, this technique has performance degradation at end-fire. Both plane wave and range focused beamforming cannot resolve the port/starboard ambiguity issues when using a linear array and neither provide depth estimates.

Another method for estimating range is the multipath ranging technique, which is strictly a manual process. Given a bearing-time display, the operator must calculate range based on the various acoustic propagation paths associated with a particular contact. This process is tedious, prone to error, and requires the operator to know the acoustic environment. The process also only works in specific environments. All of the acoustic-source localization techniques described thus far also do not work well in shallow water.

Matched field processing is another localization technique. This technique is very computational and expensive, and to date this has prohibited use in real-time applications. Systems incorporating matched-field processing thus far have been restricted to the laboratory where very small data sets are processed over very restricted search regions (bearing, range, depth, and frequency). Generally, these systems also have utilized vertical stationary arrays, rather than horizontal mobile arrays.

A number of patent efforts have been directed to point source localization systems and methods and include the following.

U.S. Pat. No. 5,357,484 issued to Bates et al. on Oct. 18, 1994 discloses an acoustic source localization method which determines the range and depth to an acoustic source from a sampling site in a medium, with the aid of a linear array of pressure transducers; measurement, back propagation, and index processors; and an environmental model.

U.S. Pat. No. 5,481,505 issued to Donald et al. on Jan. 2, 1996 discloses an acoustic source localization method which utilizes matched field processing of measured data. This method detects, processes, and tracks sonar signals to provide bearing, range, and depth information that locate an object in a three-dimensional underwater space. An inverse beamformer utilizes signals from a towed horizontal array of hydrophones to estimate a bearing to a possible object. A matched field processor receives measured covariance matrix data based upon signals from the hydrophones and from a propagation model. A peak picker provides plane wave peaks in response to output beam levels from the matched processor. A tracker identifies peaks within the specified limit of frequency, bearing change over time, range and depth to specify an object as a target and to display its relative range and depth with respect to the array of hydrophones.

Although the above-described acoustic source localization methods as well as others have furthered technological development, none of the methods provide a low-cost system which incorporates a computationally efficient matched-field processing algorithm supporting real-time processing, a global bathymetry database allowing the system to operate in any oceanographic location, and other features including dynamic array shape compensation and high resolution range and bearing estimates.

Thus it would be greatly advantageous to provide a sonar system capable of matched field processing (MFP) that (1) supports real-time, passive, three-dimensional acoustic-source localization using a mobile horizontal array; (2) improves the performance of extant sonar systems by providing continuous localization estimates in bearing, range, and depth; (3) supports port/starboard ambiguity resolution; (4) improves acoustic sensitivity at forward and aft end-fire as well as in shallow water; (5) provides a real-time target motion analysis capability; (6) has minimal space requirements making it suitable for shipboard deployment on both surface ships and submarines; and (7) is of low cost.

SUMMARY OF THE INVENTION

It is therefore the primary object of the present invention to provide a point source localization sonar system and method of use that incorporates a computationally efficient matched-field processing algorithm supporting real-time processing.

Another object of the present invention is to provide a point source localization sonar system and method of use that supports real-time, passive, high-resolution, three-dimensional acoustic-source localization using a mobile, single-line, horizontal array.

Still another object of the present invention is to provide a point source localization sonar system and method of use that processes acoustic data from a mobile, single-line, horizontal array using dynamic array shape compensation for kite, cant, and curvature.

It is still another object of the present invention is to provide a point source localization sonar system and method of use that uses high resolution bearing, range, and depth estimates of the contact and own-ship position to estimate contact position, course, and speed in real-time providing a continuous target motion analysis capability.

Yet another object of the present invention is to provide a point source localization sonar system and method of use that provides a user interface permitting the user to steer the search region (in bearing range, depth, and frequency) and on/off switches giving the user control over display processing of the entire system.

It is yet another object to provide a point source localization sonar system and method of use that supports port/starboard ambiguity resolution.

Yet another object is to provide a point source localization sonar system and method of use that incorporates a global bathymetry database allowing for operation in any oceanographic location.

Another object is to provide a point source localization sonar system and method of use that has minimal space requirements making it suitable for shipboard deployment on both surface ships and submarines.

It is yet another object to provide a point source localization sonar system and method of use that is of comparatively low cost.

Still another object is to provide a point source localization sonar system and method of use which supports a fully integrated processing thread offering a complete sonar solution.

In accordance with the foregoing objects, the preferred embodiment of the present invention comprises a matched-field based sonar system and method of use that supports real-time, passive, three-dimensional acoustic source localization using a mobile, horizontal array. The system continuously receives and processes acoustic array, non-acoustic array, and own-ship navigational data in the matched-field process (MFP). Driven by own-ship and array status, a global bathymetry database and an acoustic environmental model are used to generate replicas for the MFP. If a three-dimensional tracker is assigned, then the tracker will automatically steer the search region to maintain contact on the target of interest. A variety of displays are provided to the user including tracker displays (which provide tracker information), MFP ambiguity surface displays (which support contact localization), and non-acoustic and navigational displays (which show status of own-ship and array). A user control interface allows a user to control the search region in bearing, range, depth, and frequency; assign the three-dimensional tracker function; and control display processing.

BRIEF DESCRIPTION OF THE DRAWINGS

Other objects, features, and advantages of the present invention will become more apparent from the following detailed description of the preferred embodiments and certain modifications thereof when taken together with the accompanying drawings in which.

DETAILED DESCRIPTION OF THE INVENTION

The present invention is a matched-field based point source localization (PSL) sonar system 1 and method of use.

Figure 1:
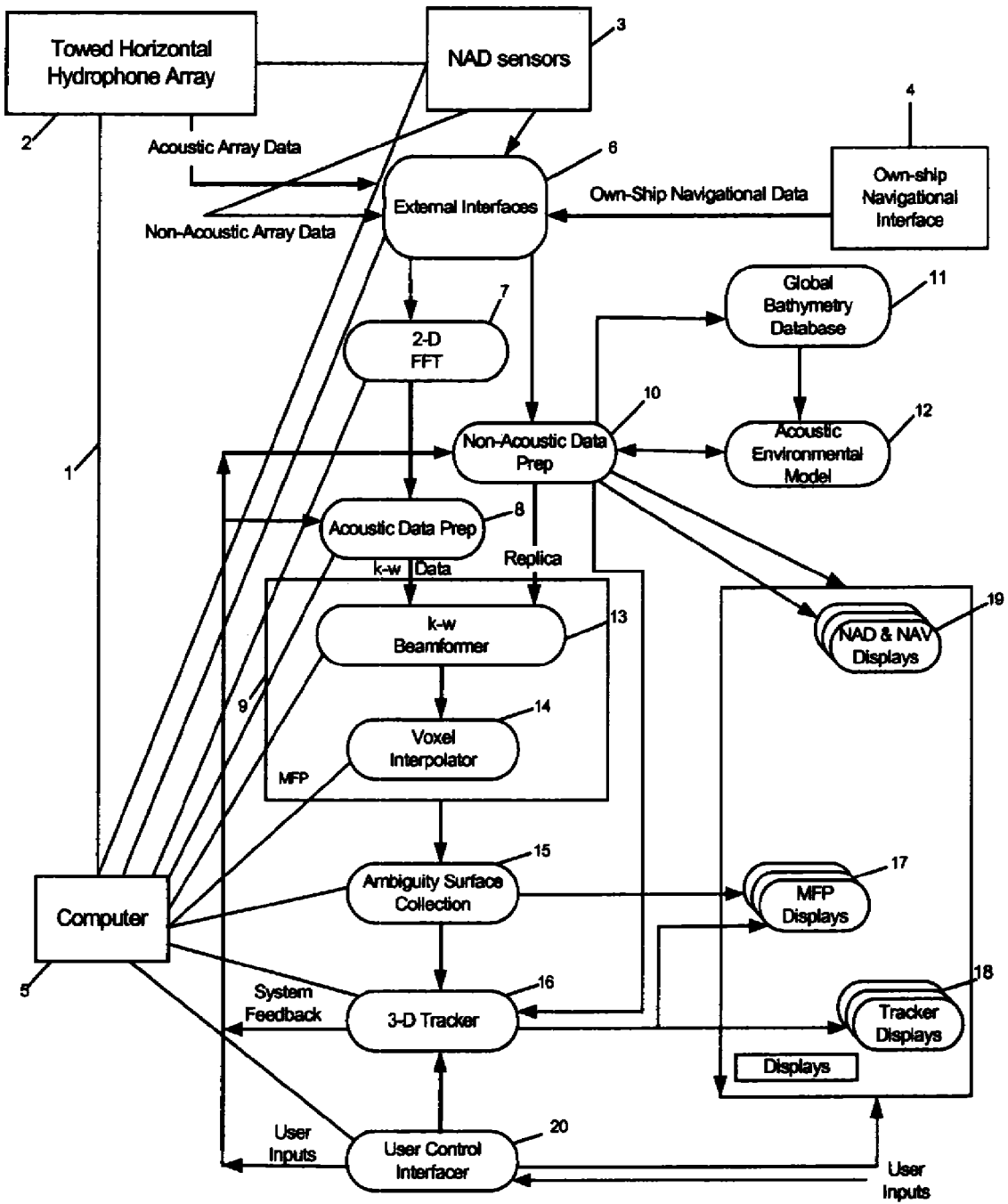
FIG. 1 is a block diagram of the point source localization (PSL) sonar system 1 of the present invention.

FIG. 1 is a block diagram of the point source localization (PSL) sonar system 1. The PSL system 1 includes a towed, mobile, single-line horizontal hydrophone array 2 along with non-acoustic data (NAD) sensors 3, and an own-ship navigational interface 4. The array 2 receives acoustic signals in the water by hydrophones. The array 2 is also equipped with non-acoustic sensors 3 to allow measurement of forward and aft depth, heading, and temperature status. Certain horizontal mobile arrays 2 can be modified to provide data from two different sets of non-acoustic sensors 3, one being from standard non-acoustic array data (NAD) sensors and the other from optional Engineering Modules (EMODs) which provide greater accuracy.

For purposes of the present invention one or both sets of non-acoustic sensors 3 may be utilized, though both are preferred. The data is collected from non-acoustic sensors 3 and is forwarded to the rest of the system 1. To collect own-ship navigational data including ship's heading, depth, speed, latitude, and longitude, the system 1 may utilize a standard shipboard electronic navigation system interface 4 such as the Navigation Sensor System Interface (NAVSSI). A communication link or data bus 5 (such as an RS 232 line) connects the hydrophone array 2, non-acoustic data sensors 3, own-ship navigational interface 4, the external Interface 6, and all other components of the PSL sonar system 1 are described below.

The External Interface 6 receives data from the hydrophones in the acoustic array 2 and the non-acoustic sensors 3 and the navigational interface 4 in real-time. Non-acoustic array data from the non-acoustic data sensors 3 of particular interest includes forward and aft depth, heading, and temperature status. Own-ship navigational data of interest derived from shipboard controls via the own-ship navigational interface 4 includes own-ship's heading, depth, speed, latitude, and longitude.

A two-dimensional Fast Fourier Transform (FFT) 7 and an Acoustic Data Preparation processor 8 process the acoustic array data into frequency-wave number (k-w) data to be sent to a matched-field processor (MFP) 9. In addition, a Non-Acoustic Data Preparation processor 10 processes the non-acoustic array data and own-ship navigational data to generate accurate replica data. The Non-Acoustic Data Preparation processor 10 extracts data from a Global Bathymetry Database 11 for generating replica data with the aid of an Acoustic Environmental Model 12. The PSL system 1 can utilize any suitable bathymetry database 11 that provides ocean depth under own-ship, given a latitude and longitude. For example, the system 1 can employ a "Digital Bathymetry DataBase Variable Resolution (DBDB-V). The Global Bathymetry Database 11 preferably operates in any oceanographic location. Additionally, the system 1 can use any acoustic propagation model for the Acoustic Environmental Model 12, including the known Multi-Path Expansion model.

Both the k-w data (from the Acoustic Data Preparation processor 8) and replica data (from the Non-Acoustic Data Preparation processor 10) are sent to the MFP 9. The MFP 9 comprises a range-focused k-w beamformer 13 followed by a voxel interpolator 14. The system 1 makes use of a computationally efficient MFP process that supports real-time processing. Essentially, the MFP 9 compares the measured field (k-w data) against various predictions (replica data) and determines the best match in real-time.

The ambiguity surface collector 15 receives individual voxel ambiguity surfaces from the voxel interpolator 14. A voxel represents a three-dimensional volume of space with dimensions in range, depth, and angular width. A typical voxel covers 200 meters in range and 80 meters in depth subdivided in 10 meter and 2 meter increments respectively. The ambiguity surface collector 15 then forms a composite surface that is output to a three-dimensional tracker function 16 and MFP ambiguity displays 17, which directly support three-dimensional localization (i.e. bearing, range, and depth) of a contact. The tracker function 16 estimates contact latitude and longitude, and contact course and speed. This tracker-related data is sent to tracker displays 18 including a Geographic Situation (GEOSIT) display and a tracker history display. The GEOSIT display plots position (latitude and longitude) of own-ship and of the contact, and it displays estimated contact course and speed. The tracker history display is a three-dimensional display, which plots tracker bearing, range, and depth estimates as a function of time. Tracker bearing, range, and depth estimates are also displayed on the MFP ambiguity surface displays 17.

The MFP displays 17 include depth vs. range display, range vs. bearing display, range time recorder display, and bearing time recorder display. The depth vs. range display shows the current depth/range ambiguity surface for the entire search region. Tracker estimates of contact depth and range are displayed if available. The range vs. bearing display shows the current range/bearing ambiguity surface for the entire search region. Tracker estimates of contact range and bearing are displayed if available. The range time recorder display is a waterfall-type display providing a history of the range ambiguity surface. The system 1 provides this display to assist the user in estimating the range history of the contact. The bearing time recorder is a waterfall-type display providing a history of the bearing ambiguity surface.

In addition to processing non-acoustic array data and own-ship navigational data to generate accurate replica data for the MFP 9, the Non-Acoustic Data Preparation processor 10 also forwards non-acoustic and own-ship navigational data to the three-dimensional tracker function 16 and to the non-acoustic array data (NAD) and navigational (NAV) displays 19. The NAD and NAV displays 19 show status of own-ship and the array, and including the following displays: own-ship depth, towed array depth, towed array cant, ocean depth, heading, and speed. The own-ship depth display plots own-ship depth and the average towed array depth as a function of time. The towed array depth display plots the depth of forward and aft portions of the towed array using NAD (and EMOD, if utilized) depth sensors as a function of time. The towed array cant will display array cant using both NAD (and EMOD, if utilized) depth sensors as a function of time. The system 1 processes acoustic data from a mobile, single line, horizontal array 2 using dynamic array shape compensation for kite, cant, and curvature. The ocean depth display plots ocean depth under own-ship and under the contact as a function of time. Depths are obtained from the global bathymetry database 11. The heading display plots heading of forward and aft sections of the array as well as own-ship as a function of time. The speed display plots own-ship and target speeds as a function of time. The displays 17, 18, 19 provide detailed visual target motion analysis (TMA) in real-time.

The user has the ability to control which displays 17, 18, 19 along with their associated processing are active, via on/off switches on an interactive user control interface 20 (i.e. control panel). The user can also control the search region in bearing, range, depth, and frequency, and also assign the three-dimensional tracker function 16. Despite these user controls, the system 1 itself is designed to operate in an autonomous manner.

Using high-resolution range and bearing estimates of the contact, as well as own-ship position, the system 1 can estimate contact position (latitude and longitude), course, and speed. This is done in real-time and provides a continuous solution. The system 1 is of low cost and has minimal space requirements making the system shipboard deployable. Additionally, the system 1 provides improved aft end-fire as well as shallow water performance. The system 1 has an architecture that supports a fully integrated processing thread, which provides a complete sonar solution.

Figure 2A:
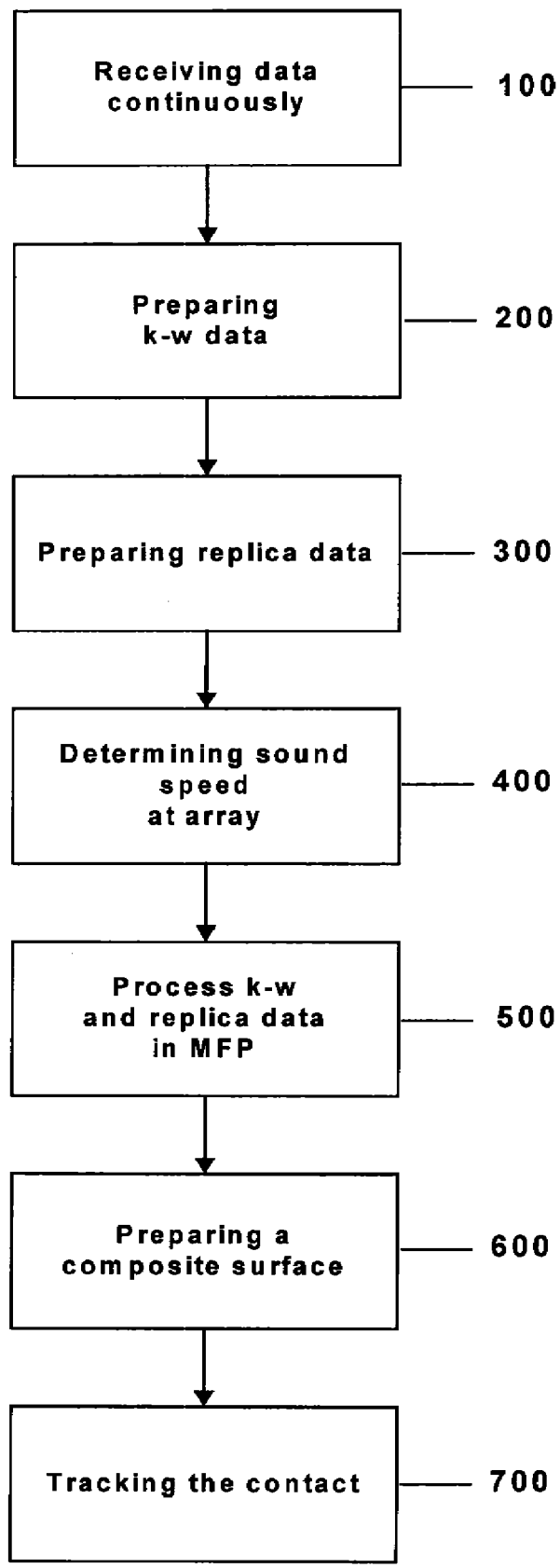
FIG. 2A is a flowchart of the steps of the operating procedure of the PSL sonar system 1 disclosed in FIG. 1.

FIG. 2A is a flowchart of the steps of the operating procedure of the matched-field based point source localization (PSL) sonar system 1 as disclosed in FIG. 1. The steps generally comprise the following:

Step 100. Receiving data continuously
Step 200. Preparing k-w data
Step 300. Preparing replica data
Step 400. Determining sound speed at array
Step 500. Processing k-w and replica data in MFP
Step 600. Preparing a composite surface
Step 700. Tracking the contact Step 100 involves the External Interface 6 continuously receiving three different types of data: 1) raw hydrophone data, 2) non-acoustic array data, and 3) own-ship navigational data. Once something makes sound in a given direction, the hydrophones will detect the signal and then the External Interface 6 will continuously receive this raw hydrophone data from the acoustic array 2. Additionally, the External Interface 6 will continuously receive non-acoustic array data from the non-acoustic sensors 3. The External Interface 6 also continuously receives own-ship navigational data from the own-ship navigational interface 4.

Figure 2B:
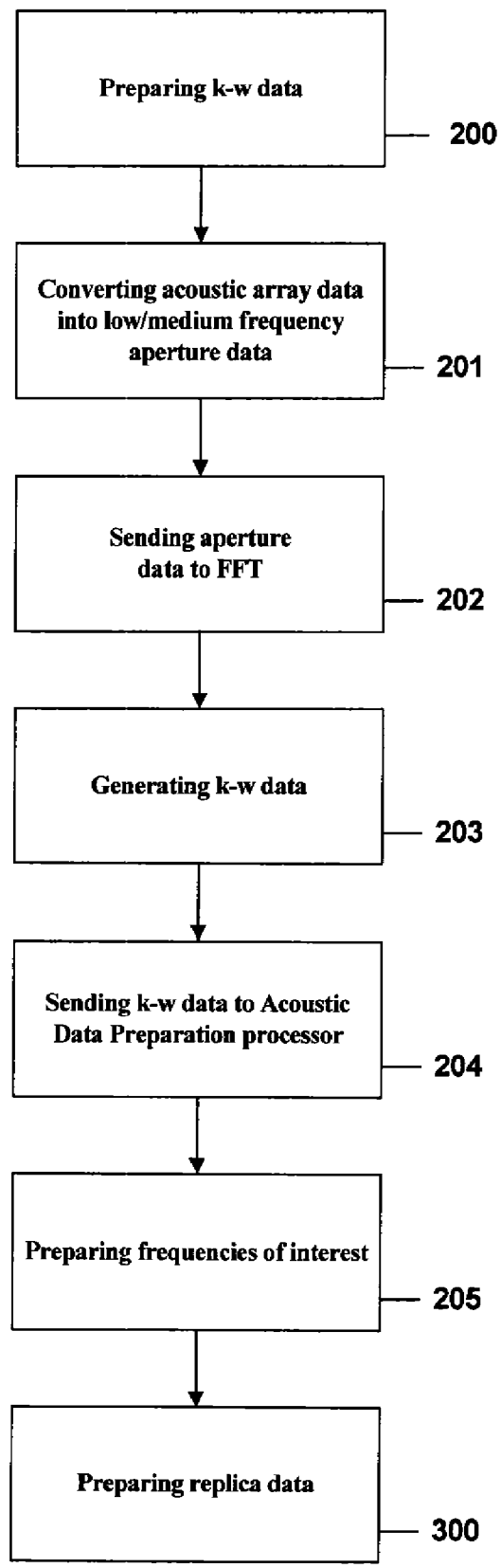
FIG. 2B is a flowchart of the substeps of step 200.

FIG. 2B shows the substeps of step 200 (Preparing k-w data for the MFP 9). Step 200 essentially comprises substeps 201-205, beginning with substep 201: converting acoustic array data into low/medium frequency aperture data. The External Interface 6 converts acoustic array data into low/medium frequency aperture data. Following substep 201 is substep 202: sending aperture data to FFT 7. The External Interface 6 sends the low/medium frequency aperture data to the two-dimensional Fast Fourier Transform (FFT) 7. Substep 203 follows substep 202. Substep 203 involves generating frequency-wave number (k-w) data. The two-dimensional FFT 7 generates frequency-wave number (k-w) data for the Acoustic Data Preparation processor 8 to process. This data represents the different frequencies and wave numbers (k-w data) that make up the sound. The FFT is an efficient algorithm used to compute the discrete Fourier transform (DFT) and its inverse for a number of different applications, including analyzing frequencies contained in a sampled signal (for digital signal processing). The Fourier analysis based on an FFT is computationally superior to other beamforming techniques, e.g., time delay processing or frequency domain phase-shifts, when an entire set of look directions are required.

The k-w data is generated for processing in the Acoustic Data Preparation processor 8. The k-w data is sent to the Acoustic Data Preparation processor 8 in substep 204. Following substep 204 is substep 205: preparing frequencies of interest.

Figure 2C:
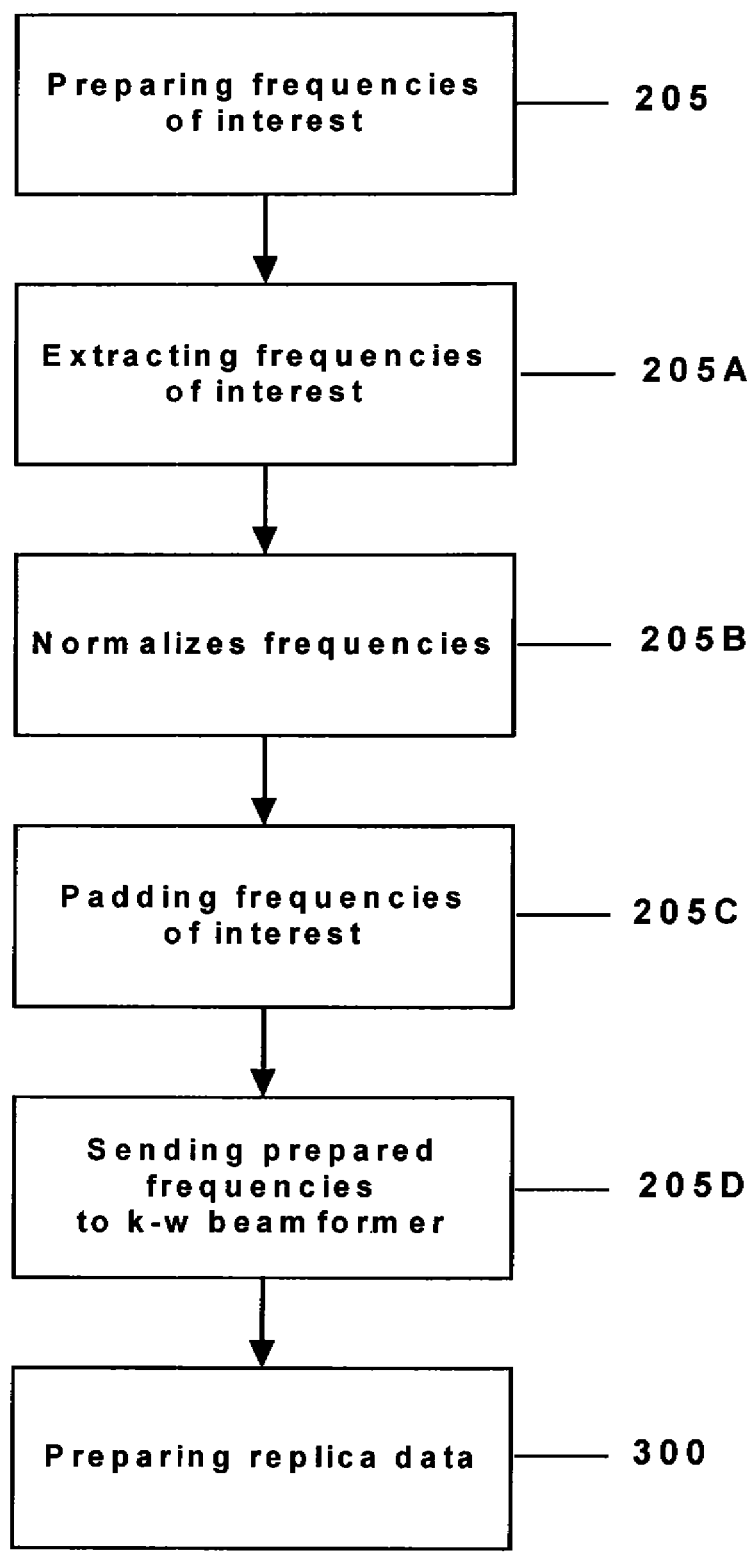
FIG. 2C a flowchart of the substeps of substep 205.

FIG. 2C shows that substep 205 further comprises four substeps 205A-205D: extracting, normalizing, padding, and sending prepared frequencies to k-w beamformer 13, respectively. The Acoustic Data Preparation processor 8 prepares frequencies of interest from the k-w data. In substep 205A, the frequencies of interest can be selected in the Acoustic Data Preparation processor 8 or by the user via the interactive user interface (i.e. control panel) 20. Despite this user interface 20, the system 1 itself can operate in an autonomous manner. After the frequencies are selected in substep 205A, their k-vectors are normalized in substep 205B. Each k-vector is normalized to unit magnitude. In substep 205C, the k-vectors are padded at either end to enable processing of the end-points by an interpolation sequence that extends beyond the end-point. The padding is accomplished by replicating the k-vector so that the last point of the vector is followed by the first point. Similarly, the k-vector is pre-pended with a replica. Following substep 205C is substep 205D: sending prepared frequencies to k-w beamformer 13. The Acoustic Data Preparation processor 8 sends prepared frequencies of interest to the k-w beamformer 13.

Figure 2D:
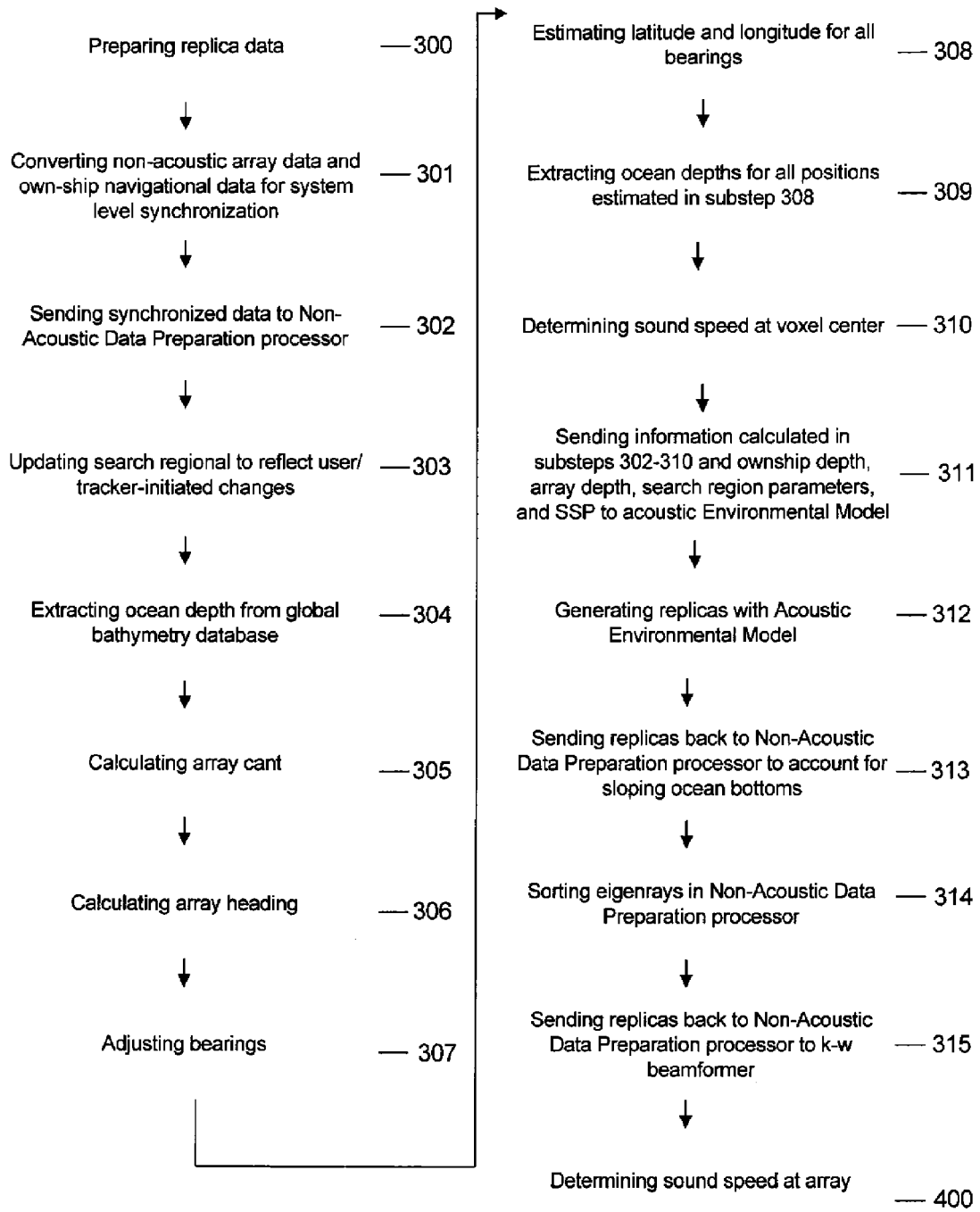
FIG. 2D a flowchart of the substeps of step 300.

FIG. 2D shows the substeps of step 300: preparing replica data. Step 300 generally comprises substeps 301-315, beginning with substep 301: converting non-acoustic array data and own-ship navigational data for system level synchronization. The External Interface 6 converts non-acoustic array data and own-ship navigational data into a digital frame format and appends a time stamp onto both types of data to support system level synchronization. Substep 302 involves the External Interface 6 sending the synchronized data to the Non-Acoustic Data Preparation processor 10 to generate replica data. Following this is substep 303, wherein the Non-Acoustic Data Preparation processor 10 updates the search region to reflect user/tracker-initiated changes. In substep 304, the Non-Acoustic Data Preparation processor 10 extracts ocean depth under own-ship from the Global Bathymetry Database 11 based on own-ship latitude and longitude. Substep 305, calculating array cant, follows substep 304. The Non-Acoustic Data Preparation processor 10 calculates array cant using towed array forward and aft depth. Specifically, array cant=arcsin (L/D), where L is the distance between the two depth sensors along the array, and D is the difference in depth i.e., Depth (forward)−Depth(aft)

Array cant is calculated for the non-acoustic sensors 3, including both NAD and EMOD sensors, if both are utilized. Following this is substep 306: calculating array heading. The Non-Acoustic Data Preparation processor 10 calculates array heading using the average of forward and aft headings. Heading is derived from compass measurements, the compass being embedded in the towed array. Substep 307 follows, in which the Non-Acoustic Data Preparation processor 10 then adjusts all bearings in the search region to take into account discrepancies between own-ship and array headings. Following this is substep 308: estimating latitude and longitude for all bearings. The Non-Acoustic Data Preparation processor 10 estimates latitude and longitude for every bearing in the search region, based on own-ship position and maximum range of the search region. The latitude and longitude of a point at a given bearing and range from own-ship is calculated using well-known navigation techniques. In substep 309, ocean depths are extracted from the Global Bathymetry Database 11 for every position estimated in substep 308. Substep 310 involves determining sound speed at the voxel center. The Non-Acoustic Data Preparation processor 10 determines sound speed at the voxel center, for every depth within the search region, and then sends the sound speed at each voxel to the k-w beamformer 13. Sound speed at each voxel is determined using the sound speed profile (SSP). The SSP is measured using an Expendable Bathythermograph (XBT) device or extracted from a database of SSPs-referenced by date and location. SSP's depend on bathymetric conditions, and can be obtained from either the own-ship navigational interface 4 or through user inputs via the interactive user interface 20.

Following this is substep 311, in which the information calculated in substeps 302-310 and own ship depth, array depth, search region parameters, and SSP are sent to the Acoustic Environmental Model 12. The own-ship navigational interface 4 provides the own-ship data and the External Interface 6 or the user interface 20 is the source of the array and non-acoustic array data. Substep 312 follows in which the Acoustic Environmental Model 12 generates replicas for every voxel in the search region, without user interaction. Each replica that the Acoustic Environmental Model 12 generates represents a set of eigenrays modeling acoustic propagation between an array hydrophone and a hypothetical noise source location. Each eigenray has a standard set of characteristics that include: a) amplitude, b) phase, c) angle of arrival, d) angle of departure, e) number of surface reflections, f) number of bottom reflections, and g) travel time. This is followed by substep 313, wherein replicas from the Acoustic Environmental Model 12 are sent back to the Non-Acoustic Data Preparation processor 10, which adjusts travel times of the replicas to account for sloping ocean bottoms. Substep 314 follows, wherein the Non-Acoustic Data Preparation processor 10 sorts the eigenrays of the replicas by signal strength and propagation type. The eigenrays whose signal strength do not meet a predetermined minimum threshold are removed from the replica data. A final substep 315 involves sending replicas from the Non-Acoustic Data Preparation processor 10 to the k-w beamformer 13.

Following step 300 is step 400: determining sound speed at array. The Non-Acoustic Data Preparation processor 10 determines sound speed at the array, using average towed array depth and the SSP. The SSP is a table of sound speed as a function of depth. This table is entered with the depth of the towed array, and the speed of sound in water for that depth is extracted. The Non-Acoustic Data Preparation processor 10 then sends sound speed at the array to the k-w beamformer 13.

Figure 2E:
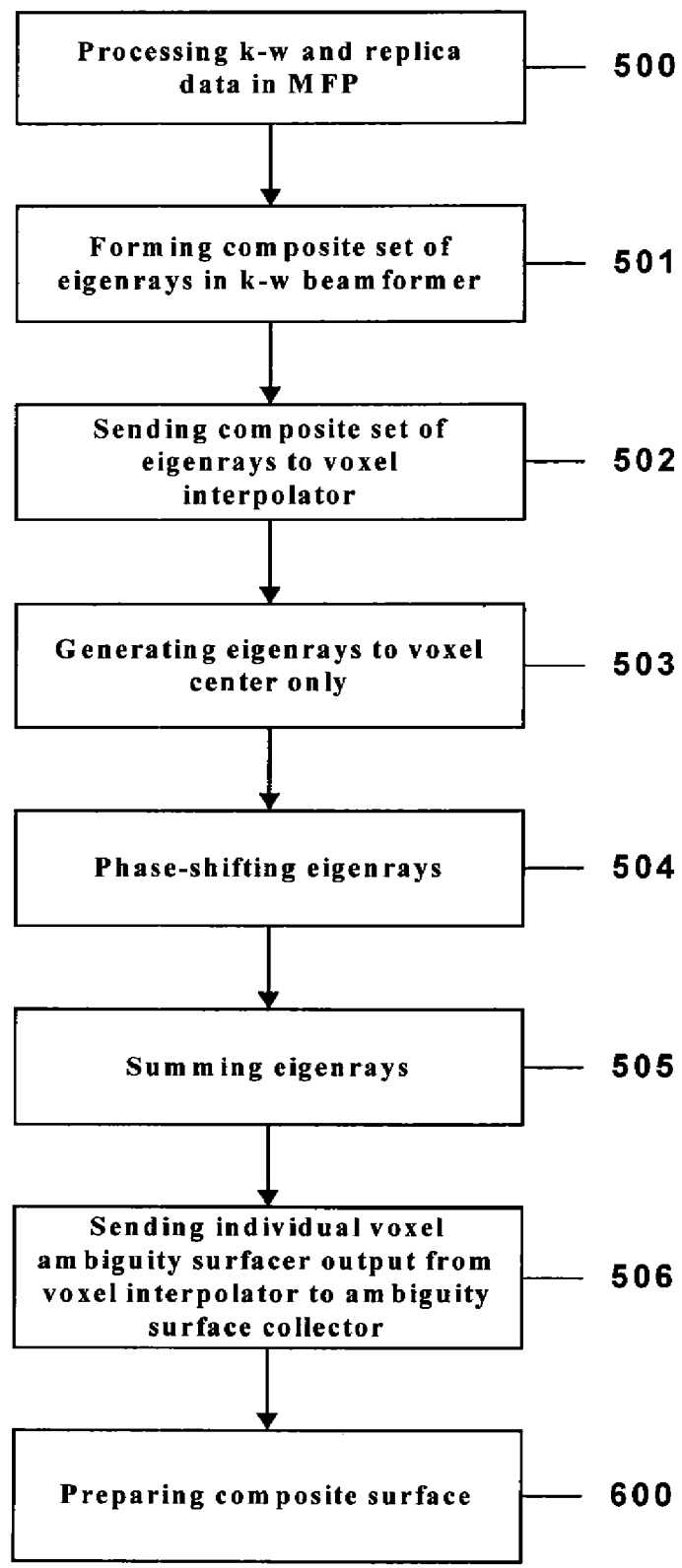
FIG. 2E a flowchart of the substeps of step 500.

FIG. 2E illustrates the substeps of step 500: processing the measured frequency-wave number (k-w) and replica data in the MFP 9 in real time. Essentially, the MFP 9 compares the measured field against various predictions and determines the best match. Step 500 generally comprises substeps 501-506, beginning with substep 501: forming a composite set of eigenrays in the k-w beamformer 13. The k-w beamformer 13 uses the measured frequency-wave number (k-w) data representing the measured acoustic field and the replica data representing the predicted acoustic field to form a composite set of eigenrays, or beams, representing acoustic propagation from the array to the center of each voxel. For any particular angular measurement, there are many different eigenrays which would produce the same measurement. Following substep 501 is substep 502: sending a composite set of eigenrays to the voxel interpolator 14 to produce an ambiguity surface for each voxel within the search region. The voxel interpolator 14 makes several assumptions to produce this surface, namely that all parameters within the voxel are constant, with the exception of travel times between the various points within the voxel. Substep 503: generating eigenrays to the voxel center follows. Eigenrays are only generated to the center of the voxel, and not to every point within the voxel. Following this are substeps 504 and 505: phase-shifting and summing eigenrays, respectively. To generate eigenrays to each point, the eigenrays to the voxel center are phase-shifted based on travel times between various points within the voxel. Eigenrays at each point are then summed, forming an ambiguity surface for that particular voxel. Finally in substep 506, individual voxel ambiguity surfaces output from the voxel interpolator 14 are sent to the ambiguity surface collector 15.

Figure 2F:
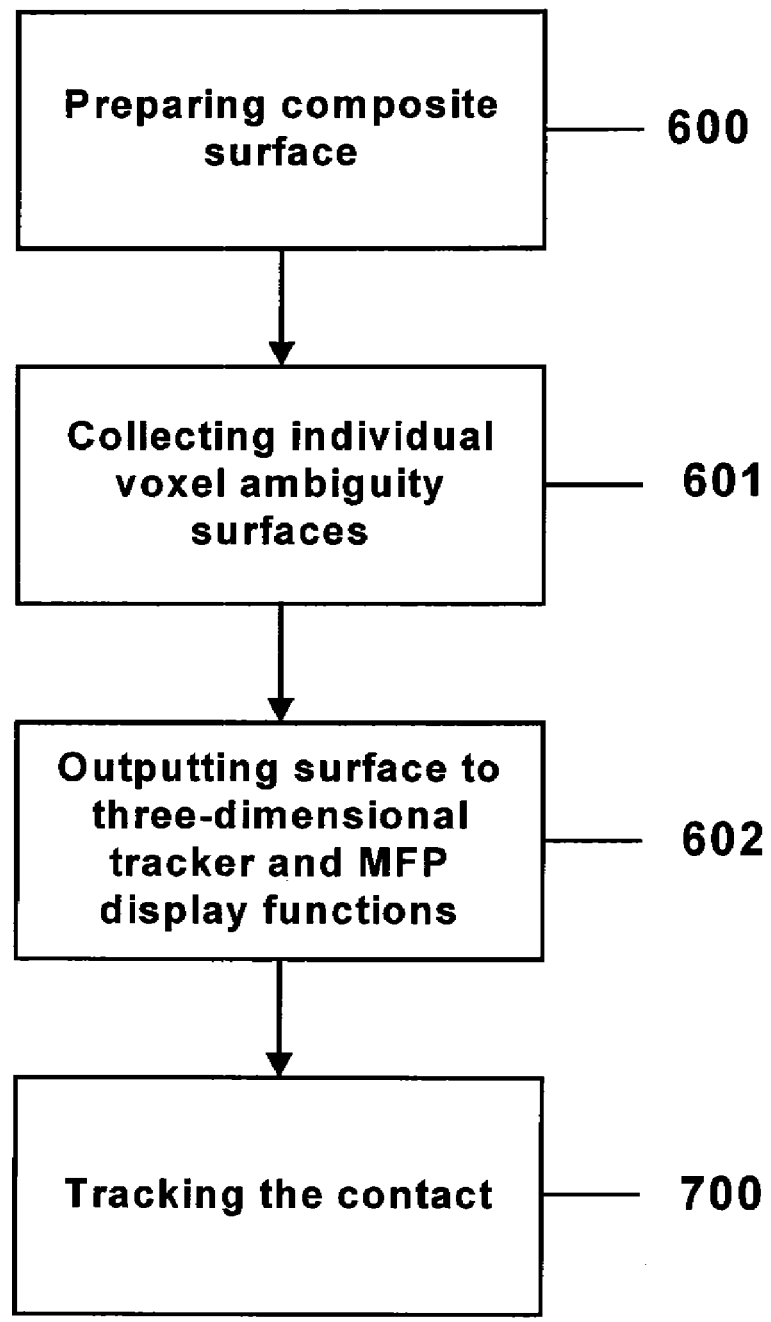
FIG. 2F is a flowchart of the substeps of step 600.

FIG. 2F illustrates the substeps of step 600: preparing a composite surface. Step 600 generally comprises substeps 601 and 602. Substep 601 involves collecting individual voxel ambiguity surfaces in the ambiguity surface collector 15 to form a single composite surface. This composite surface represents the entire search region in three dimensions. Substep 602 follows, whereby the composite surface is output to the three-dimensional tracker 16 and MFP display functions 17.

Figure 2G:
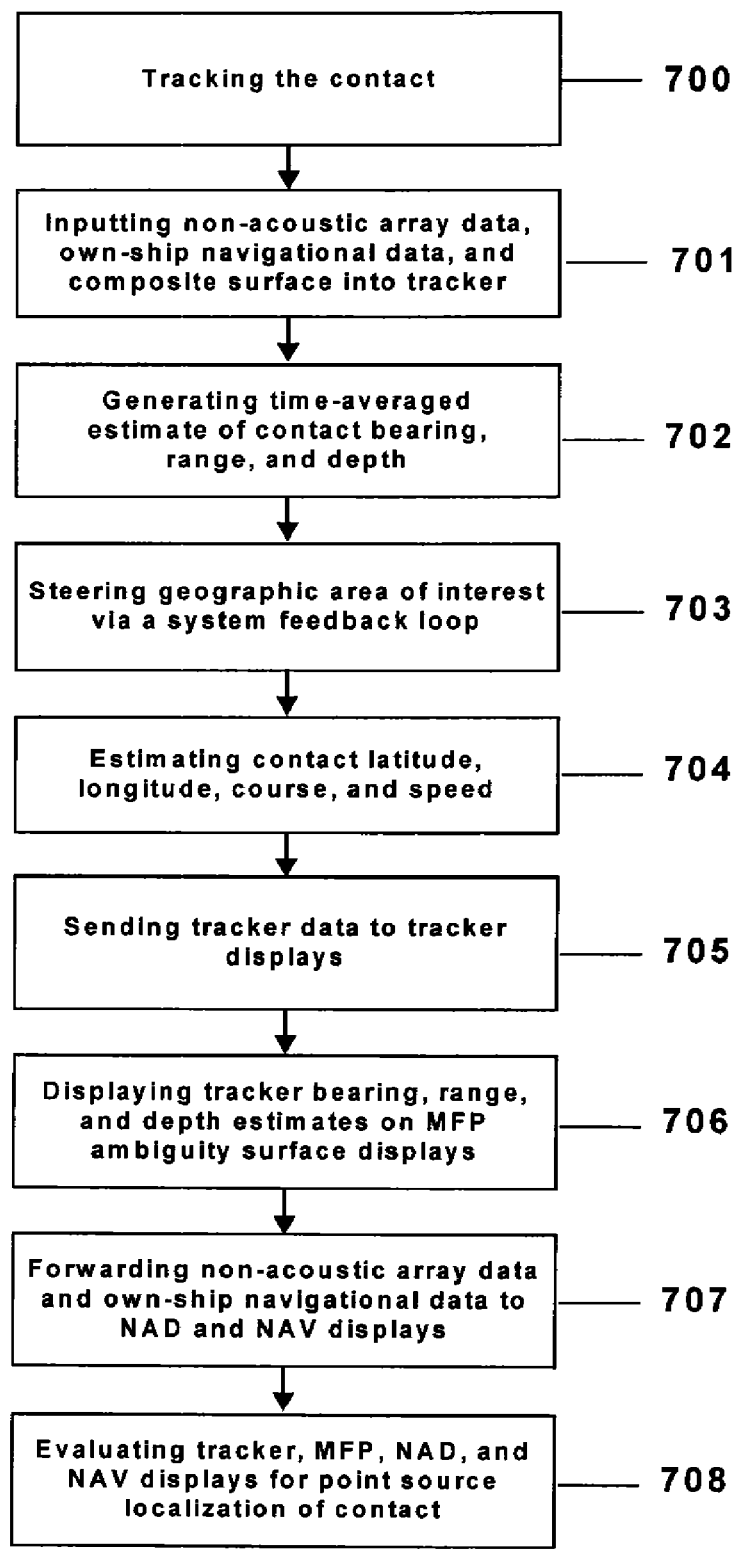
FIG. 2G is a flowchart of the substeps of step 700.

FIG. 2G illustrates the substeps of step 700: tracking the contact. Step 700 generally comprises substeps 701-708. In substep 701, non-acoustic array data, own-ship navigational data, and the composite surface is inputted into the tracker 16. The Non-Acoustic Data Preparation processor 10 provides the non-acoustic array data and own-ship navigational data, and the ambiguity surface collector 15 provides the ambiguity surface. Substep 702 follows, wherein the tracker function 16 generates a time-averaged estimate of contact bearing, range, and depth. In substep 703, the time-averaged estimate is then used to steer the geographic area of interest via a system feedback loop such that the target remains within the area of interest. The system feedback loop involves output, from the tracker 16 being inputted into the Acoustic 8 and Non-Acoustic Data Preparation processors 10. The tracker 16 will automatically steer the search region to maintain contact on the target of interest. A user may assign/reassign the three-dimensional tracker 16 via the user control interface 20, if desired. With the user control interface 20, the user can assign a search region by defining frequencies of interest and setting range, bearing, and depth limits. The user also has the ability to assign a side (e.g. port, starboard, or undecided). The user can then steer this search region in bearing, range, and depth. The tracker function 16 automatically steers the search region, even if a user assigns the tracker 16.

In substep 704, the tracker function 16 estimates the contact latitude, longitude, course, and speed. This tracker-related data is sent to tracker displays 18 in substep 705. Tracker bearing, range, and depth estimates are displayed on MFP ambiguity surface displays 17 in substep 706. The Non-Acoustic Data Preparation processor 10 also forwards the non-acoustic array data and own-ship navigational data to the non-acoustic array data (NAD) and navigational (NAV) displays 19 in substep 707. The NAD and NAV displays 19 show status of own-ship and the array. Finally, in substep 708 the NAD and NAV 19, MFP 17, and tracker 18 displays are evaluated for point source localization of contact. The interactive user interface 20 allows a user to turn on/off the displays 17, 18, 19 along with associated processing via on/off switches.

Having now fully set forth the preferred embodiment and certain modifications of the concept underlying the present invention, various other embodiments as well as certain variations and modifications of the embodiments herein shown and described will obviously occur to those skilled in the art upon becoming familiar with said underlying concept. The system 1 is robust and can support a number of different implementations. With slight modification, the system 1 would be able to support multi-line arrays and/or a long line towed arrays using subarrays. It is to be understood, therefore, that the invention may be practiced otherwise than as specifically set forth in the appended claims.

What is claimed is:

1. A point source localization sonar system comprising:
   a towed hydrophone array adapted to be towed behind a ship for receiving acoustic signals in water via a plurality of hydrophones and outputting acoustic array data;
   a plurality of non-acoustic data sensors incorporated in said towed hydrophone array for measurement of forward and aft depth, heading, and temperature and for outputting non-acoustic array data;
   a navigational interface on the ship for determining navigation data including heading, depth, speed, latitude, and longitude;
   a communication link connecting said towed hydrophone array, said non-acoustic data sensors, and said navigational interface;
   a matched-field processor capable of processing the acoustic array data into frequency-wave number data; and
   a non-acoustic data processor including a bathymetry database and acoustic environmental model, said non-acoustic data processor capable of processing the non-acoustic array data and navigation data and extracting data from said bathymetry database and said acoustic environmental model to generate replica data.

2. A point source localization sonar system according to claim 1, wherein said plurality of non-acoustic data sensors comprises non-acoustic array data (NAD) sensors.

3. The point source localization sonar system according to claim 1, wherein said plurality of non-acoustic data sensors comprise engineering module (EMODs)

4. The point source localization sonar system according to claim 1, wherein said plurality of non-acoustic data sensors comprises a combination of non-acoustic array data (NAD) sensors and engineering modules (EMODs).

5. The point source localization sonar system according to claim 1, wherein said matched-field processor further comprises a range-focused k-w beamformer and voxel interpolator.

6. A point source localization sonar system comprising:
a towed, horizontal array including acoustic sensors and non-acoustic sensors capable of providing acoustic and non-acoustic data;
a shipboard navigational interface capable of providing own-ship data;
an external interface for receiving the acoustic, non-acoustic, and own-ship data in real-time;
a two-dimensional fast Fourier transform processor for processing said acoustic data;
an acoustic data preparation processor capable of processing the acoustic data into frequency-wave number data;
a non-acoustic data preparation processor capable of processing the non-acoustic and own-ship data to generate replica data;
a global bathymetry database for providing ocean depth under own ship to said non-acoustic data preparation processor for processing the replica data;
an acoustic environmental model capable of processing the replica data;
a matched-field processor including a range-focused beamformer and a voxel interpolator, whereby said matched-field processor is capable of comparing frequency-wave number data with the replica data;
an ambiguity surface collector capable of creating a composite surface;
a three-dimensional tracker capable of accepting the composite surface and tracking a contact;
a plurality of displays capable of providing target motion analysis (TMA) in real-time; and
a communication link connected to said horizontal array, said navigational interface, said external interface, said fast Fourier transform processor, said acoustic data preparation processor, said non-acoustic data preparation processor, said global bathymetry database, said acoustic environmental model, said matched-field processor, said ambiguity surface collector, said tracker, and said plurality of displays.

7. A point source localization sonar system according to claim 6, further comprising a user control interface capable of allowing a user to control said acoustic data preparation processor, said non-acoustic data preparation processor, said plurality of displays, and said tracker.

8. A point source localization sonar system according to claim 7, wherein said plurality of displays comprise non-acoustic array data and navigational displays, matched-field processing displays, and tracker displays.

9. A point source localization sonar system according to claim 8, wherein said non-acoustic array data and navigational displays comprise: own-ship depth displays, towed array depth displays, towed array cant displays, ocean depth displays, heading displays, and speed displays.

10. A point source localization sonar system according to claim 8, wherein said matched-field processing displays comprise:
a depth versus range display, said depth versus range display capable of showing current depth and range ambiguity surface for a search region;
a range versus bearing display, said range versus bearing display capable of showing current range and bearing ambiguity surface for the search region;
a range-time recorder display, said range time recorder display capable of showing range history of the depth and range ambiguity surface; and
a bearing time recorder display, said bearing time recorder display capable of showing bearing history of the range and bearing ambiguity surface.

11. A point-source localization sonar system according to claim 8, wherein said tracker displays comprise:
a Geographic Situation (GEOSIT) display, said GEOSIT display capable of plotting position of own-ship and contact capable of displaying estimated contact course and speed; and
a tracker history display, wherein said tracker history display is a three-dimensional display capable of plotting tracker bearing, range, and depth estimates as a function of time.

12. A point source localization sonar system according to claim 6, wherein said non-acoustic sensors further comprise non-acoustic array data sensors and engineering modules.

13. A point source localization sonar system according to claim 6, wherein said global bathymetry database is a digital bathymetry database variable resolution.

14. A point source localization according to claim 6, wherein said acoustic environmental model is a multi-path expansion model.

15. A method of point-source localization comprising the steps of:
receiving acoustic array, non-acoustic array, and own-ship navigational data continuously with an external interface;
preparing frequency-wave number data with a two-dimensional Fast Fourier Transform and an acoustic data preparation processor;
preparing replica data with a non-acoustic data preparation processor from a global bathymetry database with an acoustic environmental model;
determining sound speed at an array with the non-acoustic data preparation processor;
providing a matched-field processor;
processing frequency-wave number data and replica data in the matched-field processor in real time;
preparing a composite surface with an ambuigity surface collector; and
tracking a contact with a tracker.

16. A method of point-source localization according to claim 15, wherein said step of preparing frequency-wave number data comprises the substeps of:
converting acoustic array data into low/medium frequency aperture data with the external interface;
sending aperture data from the external interface to a two-dimensional Fast Fourier Transform with the external interface;
generating frequency-wave number data with the two-dimensional Fast Fourier Transform;
sending the frequency-wave number data to the acoustic data preparation processor; and
preparing frequencies of interest in the acoustic data preparation processor.

17. A method of point-source localization according to claim 16, wherein said step of preparing frequencies of interest in the acoustic data preparation processor comprises the substeps of:
extracting the frequencies of interest;
normalizing the frequencies of interest;
padding the frequencies of interest; and
sending the frequencies of interest to a beamformer.

18. A method of point-source localization according to claim 15, wherein said step of preparing replica data comprises the substeps of:
converting the non-acoustic array data and the own-ship navigational data for system level synchronization with the external interface;

sending synchronized non-acoustic array data and own-ship navigational data to the non-acoustic data preparation processor;

updating search region to reflect user/tracker initiated changes with the non-acoustic data preparation processor;

extracting ocean depth under own-ship from the global bathymetry database;

calculating array cant with the non-acoustic data preparation processor;

calculating array heading with the non-acoustic data preparation processor;

adjusting bearings with the non-acoustic data preparation processor in the search region to account for discrepancies between ownership and array headings;

estimating latitude and longitude for the bearings with the non-acoustic data preparation processor;

extracting ocean depths from the Global Bathymetry Database for every position estimated in said step of estimating latitude and longitude for the bearings;

determining sound speed at each voxel center with the non-acoustic data preparation processor;

sending own ship depth, array depth, search region parameters, sound speed profile, and information calculated in said steps of updating a search region to reflect changes, extracting ocean depth under own ship from the Global Bathymetry Database, calculating array cant, calculating array heading, adjusting bearing to account for discrepancies between own ship and array headings, estimating latitude and longitude for the bearings, extracting ocean depths from the Global Bathymetry Database for every position estimated in said step of estimating latitude and longitude for the bearings, determining sound speed at each voxel center, to an acoustic environmental model;

generating replicas for the voxel centers in the acoustic environmental model;

sending replicas from the acoustic environmental model back to the acoustic data preparation processor to account for sloping ocean bottoms;

sorting eigenrays of the replicas by signal strength and propagation type in the non-acoustic data preparation processor; and sending the replicas from the non-acoustic data preparation processor to the beamformer.

19. A method of point-source localization according to claim 15, wherein said step of processing frequency-wave number and replica data in the matched-field processor in real time comprises the substeps of:

forming a composite set of eigenrays in the beamformer;

sending the composite set of eigenrays to a voxel interpolator;

generating eigenrays for each voxel center;

phase-shifting the eigenrays;

summing the eigenrays; and sending output from the voxel interpolator to an ambiguity surface collector.

20. A method of point-source localization according to claim 15, wherein said step of preparing a composite surface comprises the substeps of:

collecting individual voxel ambiguity surfaces in an ambiguity surface collector; and outputting a composite surface from the ambiguity surface collector to a three-dimensional tracker and a plurality of matched-field processing displays.

21. A method of point-source localization according to claim 15, wherein said step of tracking a contact comprises the substeps of:

inputting the non-acoustic array data, own-ship navigational data, and composite surface into a tracker;

generating with the tracker a time-averaged estimate of contact bearing, range, and depth;

steering a geographic area of interest;

estimating contact latitude, longitude, course and speed with the tracker;

sending data estimated in said step of estimating contact latitude, longitude, course and speed with the tracker to a plurality of tracker displays;

displaying tracker bearing, range, and depth estimates on a plurality of displays of the matched-field processor;

forwarding the non-acoustic array data and own-ship navigational data from the non-acoustic data preparation processor to a plurality of non-acoustic array data and navigational displays; and evaluating the non-acoustic array data and navigational displays, the displays of the matched-field processor, and the tracker displays for point source localization of a contact.

* * * * *